July 2, 1963 P. S. PUCKETT 3,095,662
FISH GRAPPLING AND LANDING DEVICE
Filed Dec. 6, 1961
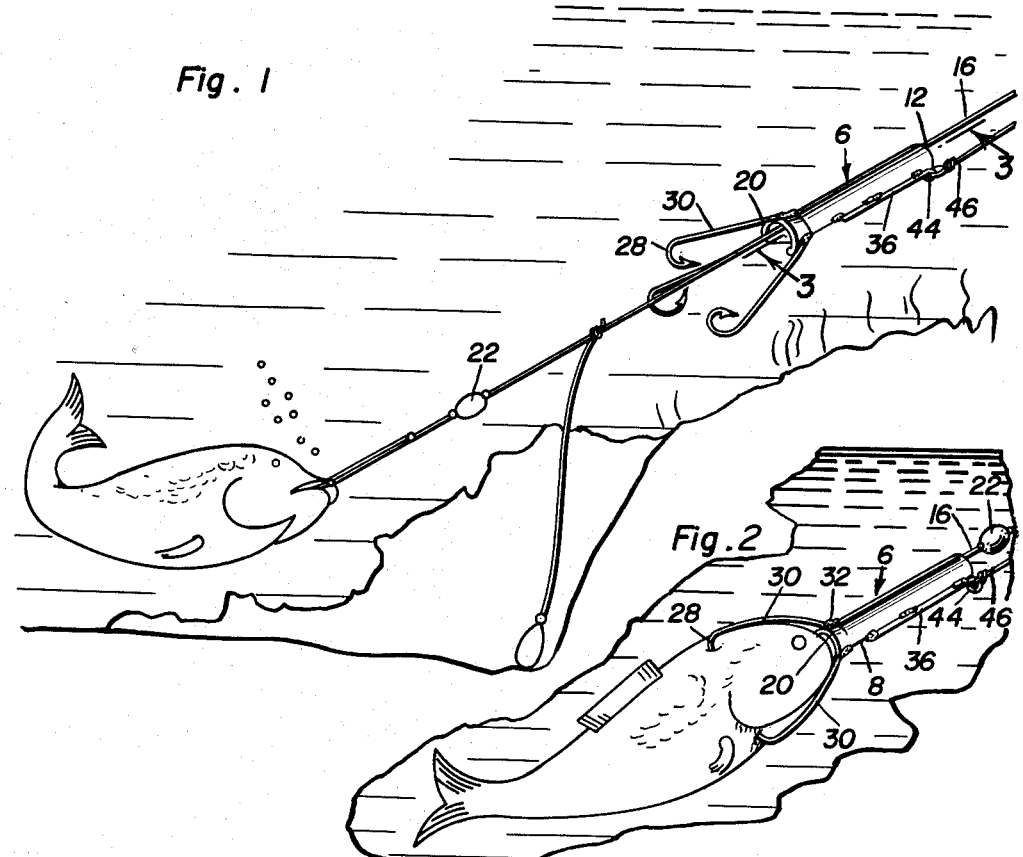
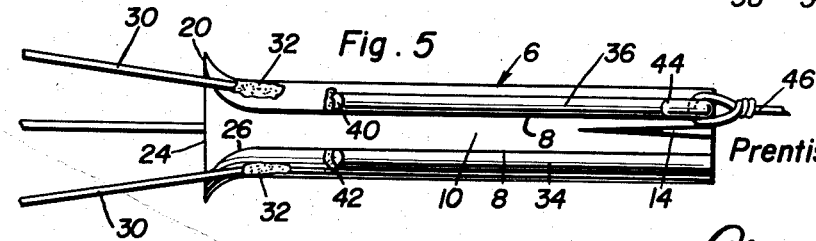
Prentiss S. Puckett
INVENTOR.

United States Patent Office 3,095,662
Patented July 2, 1963

3,095,662
FISH GRAPPLING AND LANDING DEVICE
Prentiss S. Puckett, Juliaetta, Idaho
(120 N. 7th St., Klamath Falls, Oreg.)
Filed Dec. 6, 1961, Ser. No. 157,464
1 Claim. (Cl. 43—5)

This invention relates to an improved fish landing device of a type which is constructed to be readily and slidingly attached to a fishing line in a manner to ride down the line and effectively grapple the hooked fish, said device having a controlling and retrieving line attached thereto.

Briefly, the device comprises (1) a heavy split or slotted sleeve, (2) springy self-impaling fish grappling hooks mounted on the forward or leading end of the sleeve, (3) novel weights fixed to the slotted side of the sleeve and (4) a descent controlling and retrieving line attached to the trailing end of the sleeve.

The object of the invention is to structurally, functionally and otherwise improve upon similarly constructed and performing fish landing devices of the line-attached self-gravitating type and, having done so, to advance the art and effectively serve the purposes for which it is intended.

The sleeve is novel in that the leading end has an outwardly flaring flange defining a bell-mouth to clear and bypass line-attached sinkers or floats. The dimension and flare of the flange allows for the attachment of the attachable rear ends of converging flexibly resiliently shank portions of forwardly extending grappling hooks. Then, too, the lip of the flange contacts, stabilizes and increases the efficiency of operation of the attached ends of said shank portions.

The weights comprise heavy suitable rods which are welded or otherwise mounted to extend along the lengthwise edge portions of the slot in the sleeve. One rod has a terminal eye at the rearward end for conveniently attaching the retrieving line thereto.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in perspective of a fish landing device constructed in accordance with the invention and showing the same attached to the fishline and about to descend to trap the hooked fish;

FIGURE 2 is a view in perspective based on FIGURE 1 and showing the device in its final grappling and trapping position;

FIGURE 3 is an enlarged sectional view taken on the plane of the longitudinal section line 3—3 of FIGURE 1;

FIGURE 4 is a section with parts broken away and taken on the plane of the section line 4—4 of FIGURE 3; and FIGURE 5 is a bottom plan view illustrating details of construction not otherwise shown.

The principal component of the device comprises a non-corrodible metal sleeve 6 having a relatively narrow lengthwise slot on the bottom, the edges of the slot being denoted at 8. The sleeve proper 10 is of approximately uniform cross-section from end to end and is, of course, open at the leading and trailing ends. The trailing end is denoted at 12 and it will be observed (FIG. 3) that the interior surface of the central top portion is provided with a relatively short but satisfactorily deep groove 14. This constitutes a seating and guiding groove for that portion of the fishing line 16 which cooperates therewith as denoted in dotted lines in FIG. 3. As better shown in FIG. 5 this groove is substantially V-shaped in plan and the wider or trailing end thereof opens through the trailing end 12. The forward or leading end 18 is fashioned into an outwardly enlarging or flaring flange 20 which defines a bell mouth and which assists in assuring unhampered descent of the device from the position shown in FIG. 1 to the final landing position shown in FIG. 2. This flared end construction enables the downsliding end portion of the sleeve to avoid collision with sinkers such as may be used on the leader, for instance, as shown at 22 in FIGURE 1. As a matter of fact, this bell mouth constitutes a deflector for twigs and similar obstructions which may be encountered when the device is being dropped into its intended fish trapping and landing position. It will be further observed that the edge portions 24 of the flared flange are curved convexly as at 26 where they merge into or with the adjacent end portions of the slot edges 8.

There are several properly tensioned or springy grappling hooks provided on the leading end and these hooks are circumferentially spaced and project forwardly beyond the leading end. The barbed hooked terminals 28 are directed inwardly toward each other in the manner best illustrated in FIG. 1. The shank portions converge toward the bell mouth and the rear end portions 30 rest upon and extend rearwardly over the lip portion of the flange as shown in FIGURE 3 with the terminals welded or otherwise anchored on the sleeve as best shown in FIGS. 3 and 5. These hooks are automatic in operation in that they are able to spread over and encompass the head of the fish as shown in FIG. 2 whereupon the inherent spring properties serve to embed or impale the hooks in the fish as shown.

Inasmuch as a comparatively short sleeve is preferred and since it is usually dropped a distance of some 4 to 8 feet when preparing to land the fish it has been found that added weight is generally needed. To this end weights are provided, each weight comprising a rod. One rod is designated at 34 and the other one at 36. The rear ends 38 are flush with the trailing end 12 of the sleeve and the forward ends 40 terminate short of the bell mouth. Both rods are welded in place at 42 so that they are parallel to each other and extend a substantial distance along the lengthwise edge portions 8 of the slot. The terminal or rearward end of the rod 36 is fashioned into an eye 44 which serves to permit the cooperating end of the retrieving and controlling line 46 to be attached thereto.

As will be evident, the slot permits the sleeve to be readily positioned on the fishing line and the weights 44 along the slotted portion assist in locating the sleeve so that it successfully maintains itself on the fishing line and tends to cause the line to ride along the interior surface of the top portion 10 with a portion of the line effectively seated in the aforementioned groove 14. Practice has shown that the sleeve as constructed in accordance with this invention effectively rides and retains itself on the line particularly because of the weighted slotted bottom portion.

Experimental use of the invention herein disclosed has repeatedly revealed its efficiency in landing certain fish, for example, salmon. It facilitates catching and holding the fish regardless of whether he is wriggling and moving toward or away from the fisherman or to either side at any angle. Then, too, the manner in which the springy hooks are constructed and mounted greatly assists in enabling the hooks to adapt themselves to ever-varying fishing conditions. All that the fisherman has to do is to place the slotted bottom of the weighted sleeve on the fishing line and let it go. It will not roll off or become detached. It slides over sinkers (if any are used on the line) and is highly effective in fish retrieving needs over ice, logs and particularly over banks and inclines.

It is submitted that a careful consideration of the description in conjunction with the views of the drawing will enable the reader to obtain a clear and comprehensive understanding of the construction and features and advantages of the invention. Therefore, a more extended description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A fish landing device comprising a rigid elongated tubular sleeve having a lengthwise slot in one side, the ends of said sleeve being open and defining a leading and trailing end when said sleeve is placed on a fishing line, the leading end of said sleeve being circular in cross-section and having means formed integral therewith for enabling the sleeve to clear the sinker on said fishing line, said means comprising an outwardly flaring flange defining a bell mouth having a lip, a plurality of circumferentially spaced self-setting resilient grappling hooks placed on said sleeve adjacent the leading end and said bell mouth, the hooked forward ends being turned in toward each other, and the shank portions being resilient and converging towards each other at their rearward ends by engaging the marginal edge of the lip of the bell mouth flange and having rearward ends affixed to the leading end portion of the sleeve just rearwardly of but adjacent to said lip, said sleeve being provided along the major portions of the opposed longitudinal edges of said slot with elongated spaced parallel fixedly mounted heavy rods providing weights for enabling the sleeve to gravitate down the fishing line, the rearward end of one rod having a terminal eye for attachment thereto of a retrieving line, said sleeve further being provided with, in the interior of the trailing end portion opposite said slot a fishing line seat and sleeve-guiding groove, the latter being V-shaped in plan and varying in depth, its deeper end located at the trailing end of said sleeve, the outwardly flaring flange defining said bell mouth being formed continuous with the tubular sleeve body and the leading edges of said slot being flared outwardly widening the entrance to the interior of the sleeve for passage of said sinker and merging with said bell mouth.

References Cited in the file of this patent

UNITED STATES PATENTS

| | | |
|---|---|---|
| 2,235,371 | Jyrkas | Mar. 18, 1941 |
| 2,586,073 | McKee | Feb. 19, 1952 |
| 2,641,078 | Gearien | June 9, 1953 |
| 2,807,906 | Mun | Oct. 1, 1957 |
| 2,909,861 | Leming | Oct. 27, 1959 |